United States Patent [19]
Kitaj

[11] 3,873,352
[45] Mar. 25, 1975

[54] ABRASION RESISTANT ONE STEP GLASS COATING WITH EXCELLENT LABELABILITY
[75] Inventor: Walter Kitaj, Toledo, Ohio
[73] Assignee: Owens-Illinois, Inc., Toledo, Ohio
[22] Filed: Feb. 26, 1973
[21] Appl. No.: 335,768

Related U.S. Application Data
[63] Continuation-in-part of Ser. No. 209,367, Dec. 17, 1971, abandoned.

[52] U.S. Cl. .................. 117/124 E, 65/60, 117/94, 117/124 F, 215/DIG. 6, 260/296 MN
[51] Int. Cl. ...................... C03c 17/30, C03c 17/32
[58] Field of Search...117/124 F, 124 E, 94, 161 UF; 65/60; 215/DIG. 6; 260/29.6 MN

[56] References Cited
UNITED STATES PATENTS

| | | | |
|---|---|---|---|
| 2,971,864 | 2/1961 | Speier | 117/125 GN |
| 2,995,533 | 8/1961 | Parmer | 117/124 E |
| 3,108,920 | 10/1963 | Lagally | 117/94 |
| 3,352,708 | 11/1967 | Lyon et al. | 65/60 |
| 3,425,859 | 2/1969 | Steigelman | 65/60 |
| 3,438,801 | 4/1969 | Schlientz | 117/124 F |
| 3,560,543 | 2/1971 | Plueddemann | 117/135.1 |
| 3,655,353 | 4/1972 | Nalley et al. | 117/126 GS |
| 3,663,254 | 5/1972 | Wade | 117/124 E |

*Primary Examiner*—William D. Martin
*Assistant Examiner*—William H. Schmidt
*Attorney, Agent, or Firm*—Henry P. Stevens; Edward J. Holler

[57] ABSTRACT

Good abrasion resistance and labelability can be obtained on a glass surface by applying thereto at a temperature below 450°F. a coating consisting essentially of a mixture of a polyolefin and an ethylenediaminopropyltrialkoxysilane or a polyethyleneiminepropyltrialkoxysilane in an aqueous medium. The scratch resistant properties thus produced are synergistic compared to the use of either component of the coating composition when used alone.

1 Claim, No Drawings

ABRASION RESISTANT ONE STEP GLASS COATING WITH EXCELLENT LABELABILITY

CROSS REFERENCE TO RELATED APPLICATION

This application is a continuation-in-part of my copending application, U.S. Ser. No. 209,367 filed Dec. 17, 1971 now abandoned.

BACKGROUND OF THE INVENTION

Glass derives its strength from an unblemished surface and any scratches or flaws which are present on the surface decrease the strength of the glass many fold. In general, glass articles such as bottles have their maximum strength when first formed and this strength diminishes as the bottles contact each other in filling and packaging operations. For many years, glass bottles, jars, tumblers and the like have been coated with various compositions to impart good wet and dry scratch resistant or abrasion resistant properties to the surfaces thereof to decrease breakage and permit more such products to be handled by filling and packaging apparatus.

Some of the compositions previously used as a protective coating for glass include tin and titanium compounds such as stannic halides and alkyl titanates which are sprayed on the surface of the glass at a temperature of from 900°F. to 1200°F. whereby said compounds react to form $TiO_2$ or $SnO_2$. The oxide layer is tightly adhered to the surface of the glass and thereafter the glass is cooled to about 450°F. or lower and a second coating is applied consisting of polyethylene, an alcohol sulfate, a polyurethane or the like as described in U.S. Pat. Nos. 3,323,889; 3,414,429 and 3,407,085, respectively. These coatings involve two separate applications - one at the hot end of the annealing lehr and another at the cold end of the lehr. It was therefore desirable to develop a more economical coating process for glass which would eliminate the two step process and which could be carried out with a single solution at a temperature below 450°F., thus avoiding the metallic oxide coating of the prior art processes and which will produce a synergistic scratch resistant effect as well as good lubricity and label adhesion.

SUMMARY OF THE INVENTION

This invention comprises a one step process for applying a scratch resistant coating with excellent labelability to a glass surface which involves spraying an aqueous mixture of a polyolefin such as polyethylene and a silane such as polyethyleneiminepropyltrimethoxysilane or an ethylenediaminopropyltrialkoxysilane on a glass article suchh as a bottle at a temperature of from about 250°F. to 450°F. It has been discovered that the combination of a polyolefin with such a silane produces a coating with properties which exceed the additive effect of using either component separately. In addition, the one step process involved is more economical and reduces fire hazards since the composition is applied as an aqueous solution or emulsion.

DESCRIPTION OF THE PREFERRED EMBODIMENTS

The polyolefins which constitute one component of the proposed coating composition include polyethylene, polypropylene and polyisobutylene in the form of aqueous emulsions. A preferred composition comprises 40 parts by weight of AC polyethylene 629 sold by Allied Chemical Corporation, 61 Broadway, New York City, N. Y., 11 parts by weight of oleic acid, 2 parts by weight of potassium hydroxide and 207 parts by weight of distilled water. Details for preparing this preferred emulsion are set forth in U.S. Pat. No. 2,995,533 which disclosure is incorporated herein by reference.

The silanes employed as the second component of the coating composition of the present invention include ethylenediaminopropyltrialkoxysilanes wherein the alkoxy radical is methoxy, ethoxy or propoxy such as ethylenediaminopropyltrimethoxysilane (marketed as Z-6020 by Dow Corning Corporation, Midland, Michigan) and polyethyleneiminepropyltrialkoxysilanes of the formula

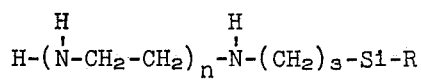

wherein R is trimethoxy, triethoxy or tripropoxy and $n$ is an integer of at least 20. The preparation of these latter silanes is described in U.S. Pat. No. 3,560,543 the contents of which are hereby incorporated by reference. More specifically, polyethyleneiminepropyltrimethoxysilane with an average molecular weight of 1400 is marketed as Z-6050 by Dow Corning Corporation, Midland, Mich.

Various proportions of the silanes and polyolefins can be employed in the process of this invention. Good results are obtained when 0.5 to 2% by weight of silane and from 0.5 to 3% by weight of an aqueous emulsion containing 20% by weight of polyolefin are dissolved or emulsified in water and sprayed on glass bottles at a temperature of about 400°F. However, a preferred coating composition comprises about 0.5% by weight of silane and about 1% by weight of an aqueous emulsion containing 20% by weight of polyolefin.

The coating composition can be applied by any suitable means such as a traversing spray nozzle at varying rates of from one pint to one quart of the aqueous coating per 100 square feet of the lehr belt. Desirably, the spraying is done near the cold end of the lehr when the glassware is at a temperature of 300° to 400°F. A spray rate of from 1 to 3 gallons per hour is generally employed.

The following examples specifically illustrate the invention but are not to be construed as limiting the same.

EXAMPLE 1

An aqueous emulsion containing 0.5 % by weight of polyethyleneiminepropyltrimethoxysilane (average molecular weight 1400 marketed as Z-6050 by Dow Corning Corporation) and 1% by weight of the preferred polyethylene composition previously described was sprayed on glass bottles at a rate of 3 gallons per hour at a temperature of 350°F. and the resulting coating was cured for 10 minutes at the same temperature. The effectiveness of the coating thus obtained was determined with a scratch test machine described in U.S. Pat. Nos. 3,323,889 and 3,368,915. The treated glass bottles had a scratch resistance of 100 pounds compared to bottles coated only with Z-6050 silane as a 0.5% aqueous solution which scratched at 20 pounds and those coated only with a 1% polyethylene emulsion which also scratched at 20 pounds. The bottles treated with the silane-polyethylene combination had a lubricity as measured by the angle of repose of 17° whereas untreated bottles began to slide at an angle of 335°. In addition, it was found that paper labels using various types of glue such as casein, dextrine and jelly gum readily adhered to the surface of the silane-polyethylene or the silane treated bottles but that such labels did not adhere to bottles treated only with polyethylene.

EXAMPLE 2

The same procedure as described in Example 1 was followed except that the coating composition employed contained 0.5% by weight each of the Z-6050 silane and polyethylene. The treated glass surface did not scratch under a 100 pound load whereas untreated bottles scratched when only a 3 pound load was applied. The lubricity and label adhesion of the treated bottles was excellent.

EXAMPLE 3

An aqueous emulsion containing 1% by weight of Z-6050 silane and 3% by weight of the polyethylene composition employed in Example 1 was sprayed on glass bottles at the cold end of the annealing lehr (400°F.) at a rate of 3 gallons per hour. The cured coating had the same desirable scratch resistant and label adhesion properties as the coatings employed in Examples 1 and 2.

EXAMPLEE 4

A coating composition containing 2% by weight of Z-6050 silane and 1% by weight of the polyethylene emulsion previously described in an aqueous medium was applied to glass bottles at a temperature of 350° - 400°F. in the form of a spray. The scratch resistance of said coating was at least 80 pounds which was vastly superior to the scratch resistance of 20 pounds for the silane coating alone and 20 pounds for the polyethylene coating alone.

EXAMPLE 5

Glass bottles were sprayed as described in the foregoing examples with an aqueous composition containing 0.5% by weight each of ethylenediaminopropyltrimethoxysilane (markketed as Z-6020 by Dow Corning Corporation) and polyethylene as well as 0.25% by weight of Z-6050 silane previously described. The resulting coating resisted scratching under a load of 100 pounds whereas the polyethylene coating alone was readily scratched when a 15 pound load was applied. Furthermore, paper labels did not adhere to the polyethylene coating whereas such labels readily adhered to the combination coating.

If desired, other silanes such as ethylenediaminopropyltriethoxysilane, ethylenediaminopropyltripropoxysilane, polyethyleneiminepropyltriethoxysilane and polyethyleneiminepropyltripropoxysilane as well as other polyolefins such as polypropylene or polyisobutylene can be employed in place of the silanes and polyethylene shown in the illustrative examples. Such coating compositions when applied to a glass surface produce equally effective scratch resistant and lubricious properties with good labelability.

I claim:

1. A glass article having a coating over its major exterior surface to increase abrasion resistance, lubricity and label adhesion, said coating formed by spraying on the glass surface at a temperature below 450°F. an aqueous composition containing 0.5% by weight of polyethyleneiminepropyltrimethoxysilane with a molecular weight of about 1400 and 1% by weight of a polyethylene emulsion containing 20% by weight of polyethylene.

* * * * *

UNITED STATES PATENT OFFICE
CERTIFICATE OF CORRECTION

Patent No. 3,873,352            Dated    March 25, 1975

Inventor(s) Walter Kitaj

It is certified that error appears in the above-identified patent and that said Letters Patent are hereby corrected as shown below:

Column 3, line 2, "335°" should be -- 35° --.

Column 3, line 30, "EXAMPLEE 4" should be -- EXAMPLE 4 --.

Column 4, line 8, "markketed" should be -- marketed --.

Signed and sealed this 24th day of June 1975.

(SEAL)
Attest:

RUTH C. MASON                C. MARSHALL DANN
Attesting Officer            Commissioner of Patents
                                  and Trademarks